UNITED STATES PATENT OFFICE.

DANIEL F. COMSTOCK, OF BROOKLINE, MASSACHUSETTS.

MARINE PROTECTIVE COATING.

1,123,687. Specification of Letters Patent. Patented Jan. 5, 1915.

No Drawing. Application filed November 7, 1910. Serial No. 591,181.

*To all whom it may concern:*

Be it known that I, DANIEL F. COMSTOCK, a citizen of the United States, residing at Brookline, in the county of Norfolk and State of Massachusetts, have invented certain new and useful Improvements in Marine Protective Coatings; and I do hereby declare the following to be a full, clear, and exact description of the invention, such as will enable others skilled in the art to which it appertains to make and use the same.

The present invention relates to protective coatings for ships' bottoms, or for other things exposed to fouling by animal or vegetable growths.

Many protective coatings have been proposed for use on ships' bottoms in order to prevent the accumulation of marine growths thereon, contemplating various sorts of preparations, almost all of which are intended to deteriorate under the action of water to thereby produce or expose materials which are hostile to marine life, or to be soft enough so that they will break away under the grip of the gradually maturing growths. Such coatings are in a large measure destroyed by use and require more or less frequent renewals. They are particularly unfitted for use on iron ships, since the iron should be protected by a permanent and water-resisting coating to prevent its corrosion under the action of the water, and especially salt water. Copper sheathings for wooden vessels have been employed, but this is very expensive and utterly unfitted for iron ships.

The object of the present invention is the production of a water-resisting anti-fouling protective coating for marine structures which does not exhibit any substantial deterioration in use, and which is cheap and easily applied.

With the above object in view, the present invention contemplates a water-resisting paint or coating in which is incorporated a radio-active substance or substances. The so-called radio-active substances receive their names from their remarkable property of continuously sending out certain radiations or rays. Most of the radio-active substances have also the remarkable property that they will of themselves emanate these rays continuously through long periods of time with no sensible diminution in activity. It is well known that these rays, if sufficiently strong, will exert an exceedingly harmful, or even destructive, action upon any living organisms upon which they may fall. The rays which will be continuously thrown off by the radio-active substances from this coating will fall upon the low forms of marine life which seek to attach themselves to any surface covered with the coating, and either prevent their attachment thereto, or else destroy them before they can attain a sufficient size to foul the surface. A surface so coated will thus maintain itself clean and free from animal or vegetable growths.

The preferred form of coating consists of a water-resisting binder mixed with uranium oxid in any proportion such that the radio-activity is substantial. Any suitable water-resisting binder may be employed, such as the well-known anti-fouling copper paint known as "New Jersey," or a suitable varnish, such as spar varnish. While the binder which is used is water-resisting in the ordinary sense, it is to be understood that the invention contemplates the use of any sort of binder which is substantially water-proof, or which deteriorates slowly on exposure to water. An excellent coating is composed of 98% ordinary copper paint and 2% carnotite, which is a cheap, highly active, uranium bearing mineral. Another excellent coating is 98% spar varnish and 2% pulverulent carnotite.

In carrying out the invention it should be understood that the proper amount of radio-active substance to be included as an ingredient in the coating is to be determined by the animal or vegetable activity to which the surface is exposed; thus in the latitude 40° 45′ on the New England coast, a coating composed of 98% copper paint and 2% pulverulent uranium oxid produces a coating which, when exposed to sea water, appears wholly unaffected by any marine growth, and a buoy so coated having been exposed to the water for three months' time remained devoid of all growths, while buoys painted with the same paint without the uranium oxid and exposed to exactly the same conditions for the same length of time were considerably fouled. In higher latitudes less, and in warmer latitudes more, radio-active substance should, it is believed, be used.

In its broader aspects, the present invention is broad and generic in character, because it is the first instance of the use of a radio-active substance as an ingredient of a water-resisting paint for preventing marine growths on structures exposed to sea-water. Any sort of radio-active substance may be used—varying the proportions, however, inversely with its radio-activity.

Having thus described the invention, what is claimed is:—

1. An anti-fouling protective coating for marine structures, consisting of a water-resisting copper paint and pulverulent carnotite, substantially as described.

2. An anti-fouling protective coating for marine structures, consisting of water-resisting copper paint, 98%, and pulverulent carnotite, 2%, substantially as described.

3. An anti-fouling protective coating for marine structures, consisting of a water-resisting copper paint and a radio-active substance, substantially as described.

4. The method of preventing marine growths on ships' bottoms or the like, which consists in maintaining on the ship's bottom by means of a sea-water resisting binder a radio-active substance, the rays from which exert a harmful action on the living marine organisms attaching or seeking to attach themselves to the ship's bottom, substantially as described.

DANIEL F. COMSTOCK.

Witnesses:
 HORACE VAN EVEREN,
 GEORGE E. STEBBINS.